United States Patent [19]

Cadotte

[11] 3,926,798

[45] Dec. 16, 1975

[54] REVERSE OSMOSIS MEMBRANE

[75] Inventor: John E. Cadotte, St. Paul, Minn.

[73] Assignee: The United States of America as represented by the Secretary of the Interior, Washington, D.C.

[22] Filed: Oct. 17, 1974

[21] Appl. No.: 515,725

[52] U.S. Cl............... 210/23; 210/433; 210/500 M; 427/246
[51] Int. Cl.² .................... B01D 31/00; B01D 13/00
[58] Field of Search......... 210/500 M, 23, 321, 433; 427/244, 245, 246

[56] References Cited

UNITED STATES PATENTS

| | | | |
|---|---|---|---|
| 3,088,791 | 5/1963 | Cline et al. | 117/138.8 N X |
| 3,615,024 | 10/1971 | Michaels | 210/490 |

Primary Examiner—Frank A. Spear, Jr.
Attorney, Agent, or Firm—William S. Brown; Donald R. Fraser

[57] ABSTRACT

A reverse osmosis membrane is prepared by in situ polymerization of furfuryl alcohol on a porous support.

6 Claims, No Drawings

REVERSE OSMOSIS MEMBRANE

Numerous types of reverse osmosis membranes, and methods of preparing them, have been described in the prior art. E.g., U.S. Pat. No. 3,246,764 discloses porous glass fibers coated with polyphosphine oxide, cellulose acetate, or polystyrene; U.S. Pat. No. 3,310,488 discloses a cellulose acetate asymmetric membrane; U.S. Pat. No. 3,556,992 discloses a membrane dynamically formed on a porous support film from an inorganic or organic gel; U.S. Pat. No. 3,567,632 discloses asymmetric membranes made from aromatic polyamides and polyhydrazides; U.S. Pat. No. 3,580,841 discloses a preformed ultra-thin membrane; U.S. Pat. No. 3,585,125 discloses a membrane prepared by polymerizing N-3-hydroxyalkyl acrylamides, and U.S. Pat. No. 3,615,024 discloses preparation of porous support films used in membrane fabrication. These prior art membranes have, however, generally been subject to deficiencies such as compaction and chemical or biological degradation, resulting in too short a useful life, as well as too low flux or salt rejection, resulting in inefficient operation.

It has now been found that, in accordance with the present invention, reverse osmosis membranes having excellent flux and salt rejection properties, as well as freedom from compaction or degradation, may be prepared by coating a microporous support with an aqueous solution of furfuryl alcohol and an acid catalyst, followed by heating to polymerize the furfuryl alcohol. This results in formation of a highly selective barrier on the surface of the support.

The porous support may be any of the types conventionally used in reverse osmosis processes. The preferred supports, however, are those prepared from organic polymeric materials such as polysulfone, chlorinated polyvinyl chloride, polyvinyl butyral, polystyrene, cellulose esters, etc. Polysulfone film has been found to be a particularly effective support material for the membranes of the invention. Preparation of these support films is described in Office of Saline Water Research and Development Progress Report No. 359, Oct. 1968. It consists essentially of casting a solution of polysulfone in dimethylformamide (DMF) on a glass plate, followed by immersing in a two percent aqueous DMF solution to gel the film. The side of the polysulfone file exposed to the air during casting is called the "face" and contains very small pores, mostly under 100 angstroms in diameter. The "back" of the film in contact with the glass plate, on the other hand, has very coarse pores. For efficient results in reverse osmosis desalination, the reverse osmosis membrane is applied to the face of the polysulfone support film.

Sulfuric acid has been found to be particularly effective as the acid catalyst. However, any acid catalyst capable of polymerizing the furfuryl alochol may be used. Examples are methane sulfonic acid, toluene sulfonic acid, benzene disulfonic acid, phosphoric acid, hydrochloric acid and mixtures of these acids. It has been found that the acid catalyst, in addition to catalyzing the polymerization reaction, is to some degree incorporated into the product, thereby providing acidic groups in the membrane. E.g., the use of a 1:1 furfuryl alcohol-sulfuric acid solution has been found to yield a polymeric product containing about 2.76 percent non-leachable sulfur and about 0.4 mlq of acidic groups per gram of polymer. These acidic groups are believed to provide hydrophylic sites in the membranes, thereby enhancing their performance in reverse osmosis processes.

An additional consequence of the presence of the acidic groups in the membrane is that performance of the membrane is effected by the type of salts in the feed water, i.e., the water to be desalinated. Feed solutions containing only monovalent cations will tend to swell the membrane and produce higher flux, while those containing polyvalent cations will inhibit swelling, thereby lowering the flux but producing maximum salt rejection. Pretreatment of the membrane with a monovalent metal salt or hydroxide may increase the flux when the feed contains polyvalent ions.

Optimum concentrations of furfuryl alcohol and acid catalyst in the aqueous solution may vary considerably depending on the specific catalyst and support, as well as the feed solution. Generally, however, the concentration of each will be about 1 to 4, preferably about 1.5 to 2.5, percent by weight. The ratio of furfuryl alcohol to acid catalyst in the solution is also not critical, but a ratio of about 1:1 has generally been found to give good results.

In addition to furfuryl alcohol and the catalyst the solution may, optionally, contain other additives. E.g., isopropyl alcohol may be added in an amount of about 10 percent to 50 percent to extend the pot life of the solution. Surfactants such as dodecyl sodium sulfate may also be added to the solution to improve flux. Water soluble polymers such as polyacrylic acid may be added to increase the solution viscosity.

Application of the furfuryl alcohol-acid catalyst solution to the support may be by any conventional means such as casting the solution on the support, dipping or immersing the support in the solution, or spraying the solution on the support. Generally, formation of the coating is most conveniently accomplished by simply placing the support in the solution for a period of time sufficient to permit adsorption of a film of the solution on the support. The period of time is generally not critical, periods of a few seconds to several hours all having been found to produce good membranes.

Excess solution is allowed to drain from the support and the coated support is placed in an oven at a temperature of about 100° to 160°C to polymerize the furfuryl alcohol. Rapid polymerization of the bulk of the furfuryl alcohol, before significant evaporation or migration of the solvent takes place, results in formation of a continuous defect-free coating on the support. This polymerization generally requires about 30 to 60 seconds. Progress of the polymerization is easily observed because of a color change from white to black.

The coated support is then cured at a temperature of about 100° to 160°C, preferably about 150°C, for a period of about 1 to 30 minutes, preferably about 15 minutes, resulting in completion of the polymerization reaction. This results in an active layer of crosslinked polymerized furfuryl alcohol on the surface of the support. The thus formed composite membrane is characterized by high flux and very high salt rejection, as will be apparent from the data of the following examples. The membranes also exhibit good compaction resistance and are not effected by high chlorine concentration (50 ppm chlorine). In addition, as is apparent from the above description, the method of forming the membrane is simple and inexpensive.

Examples 1–3

A polysulfone support film was cast from a 15 (w/w) percent solution of polysulfone in dimethylformamide (DMF). A film was spread on a glass plate using an applicator with a 7 mil gap. The glass plate was immediately immersed in water containing two percent DMF and 0.5 percent dodecyl sodium sulfate. Gelation of the polysulfone in the aqueous solution produced a microporous film with fine pores on the face (air side) and coarse pores on the back (glass side). The film, approximately 5 × 20 inches, was washed in water.

The wet polysulfone support film in an aluminum tray was covered with a solution containing two weight percent of both furfuryl alcohol (FA) and sulfuric acid. The tray was held in a vertical position one minute to drain excess FA solution. The wet film was suspended in a 150°C convection oven for 15 minutes. This heat curing of the membrane produced a brown to black color. Results of 24 hour reverse osmosis tests on these membranes are presented in Table 1. When only furfuryl alcohol and sulfuric acid were used in the solution, the highest membrane flux was 12.4 gfd (Example 1). Isopropanol, although added to the FA solution to prolong the pot life, increased membrane flux up to 18.4 gfd, Example 2). A more pronounced effect on membrane flux was found when a surfactant was added to the FA solution (Example 3).

TABLE 1

| Example | Composition of Furfuryl Alcohol Solution | Reverse Osmosis Test Results* Flux, gfd | Salt Rejection, % |
|---|---|---|---|
| 1 | 2% FA, 2% $H_2SO_4$, in water | 12.4 | 99.80 |
| 2 | 2% FA, 2% $H_2SO_4$, 20% isopropanol in water | 18.4 | 99.47 |
| 3 | 2% FA, 2% $H_2SO_4$, 20% isopropanol, 0.67% dodecyl sodium sulfate in water | 38.0 | 99.61 |

*20 to 24 hour tests with 3.5 percent NaCl feed at 1,500 psi and 25°C.

Examples 4–8

The effect of the concentration of furfuryl alcohol and sulfuric acid is shown by the data of Table 2. The optimum concentration of each component in the solution under the conditions of the experiment was two percent by weight (Example 4). Changing either component to 1 percent or 4 percent had a detrimental effect on reverse osmosis properties as indicated in Examples 5 to 8.

TABLE 2

| Example | Reactant Concentration* Furfuryl Alcohol, Percent | $H_2SO_4$, Percent | Reverse Osmosis Test Data** Flux, gfd | Salt Rejection, % |
|---|---|---|---|---|
| 4 | 2 | 2 | 35.6 | 99.57 |
| 5 | 1 | 2 | 38.4 | 96.9 |
| 6 | 4 | 2 | 12.3 | 93.9 |
| 7 | 2 | 1 | 8.7 | 99.1 |
| 8 | 2 | 4 | 51.9 | 91.5 |

*Parts by weight in 20% isopropanol containing 0.67 percent deodecyl sodium sulfate.
**Tests were run 24 hours at 1,500 psi and 25°C using 3.5% NaCl feed.

Examples 9–14

Results of tests of optimum range of cure temperature are given in Table 3. Polysulfone support films were saturated in an aqueous solution containing 2 percent FA, 2 percent $H_2SO_4$, and 20 percent isopropanol. After draining excess solution, they were placed in a convection oven for 15 minutes. Table 3 shows an effective cure range between 110° and 175°C, although at 175°C plastic flow of polysulfone support film restricted flux.

Table 3

| Example | Cure Temperature | Reverse Osmosis Test Results* Flux, gfd | Salt Rejection, % |
|---|---|---|---|
| 9 | 175°C | 2.8 | 99.68 |
| 10 | 150°C | 16.1 | 99.2 |
| 11 | 130°C | 16.2 | 99.60 |
| 12 | 110°C | 8.3 | 99.71 |
| 13 | 90°C | 8.5 | 76.5 |
| 14 | 25°C | 49 | 0 |

*24 hour tests using 3.5% NaCl at 1,500 psi and 25°C.

Examples 15–17

These examples illustrate the effect of different feed solutions on the reverse osmosis performance of the membrane of Example 3, above. Results are given in Table 4. The salt composition of the synthetic sea water of Example 16 was as follows:

| Component | Concentration (Percent by weight) |
|---|---|
| NaCl | 58.490 |
| $MgCl_2.6H_2O$ | 26.460 |
| $Na_2SO_4$ | 9.750 |
| $CaCl_2$ | 2.765 |
| KCl | 1.645 |
| $NaHCO_3$ | 0.477 |
| KBr | 0.238 |
| $H_3BO_3$ | 0.071 |
| $SrCl_2.6H_2O$ | 0.095 |
| NaF | 0.007 |

The reduced flux in Example 16, as compared with Example 15, results from the polyvalent ions present in the synthetic sea water. Magnesium and calcium ions are believed to form ionic crosslinks between acid groups and the membrane, thereby reducing flux. In Example 17, the membrane was pretreated in 10 percent NH₄OH solution for 4 hours.

Table 4

| Example | Feed Water Composition | Reverse Osmosis Test Data* | |
|---|---|---|---|
| | | Flux, gfd | Salt Rejection, % |
| 15 | 3.5% NaCl | 38.0 | 99.61 |
| 16 | 3.5% Synthetic Seawater | 17.0 | 99.90 |
| 17 | Membrane pretreated with NH₄OH, 3.5% synthetic seawater | 25 | 99.83 |

*Tests were run 20-24 hours at 1,500 psi and 25°C.

I claim:

1. A process for preparation of a composite reverse osmosis membrane comprising:
   coating a microporous support with an aqueous solution of furfuryl alcohol and an acid catalyst capable of polymerizing the furfuryl alcohol;
   heating to polymerize the furfuryl alcohol; and
   curing at a temperature of about 110° to 160°C for a period of about 1 to 30 minutes.

2. The process of claim 1 in which the support consists of a polysulfone film.

3. The process of claim 1 in which the catalyst is selected from the group consisting of sulfuric acid, methane sulfonic acid, toluene sulfonic acid, benzene disulfonic acid, phosphoric acid and hydrochloric acid.

4. The process of claim 3 in which the catalyst is sulfuric acid.

5. A composite reverse osmosis membrane prepared by the process of claim 1.

6. In a process for desalination of saline water by reverse osmosis comprising contacting the saline water under pressure with a reverse osmosis membrane, the improvement comprising using the membrane of claim 5 as the reverse osmosis membrane.

* * * * *